United States Patent
Park

(10) Patent No.: US 11,136,076 B2
(45) Date of Patent: Oct. 5, 2021

(54) UNDERCOVER STRUCTURE FOR VEHICLE FOR GUIDING AIR FLOW

(71) Applicants: HYUNDAI MOTOR COMPANY, Seoul (KR); KIA MOTORS CORPORATION, Seoul (KR)

(72) Inventor: Nam-Ho Park, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 68 days.

(21) Appl. No.: 16/691,349

(22) Filed: Nov. 21, 2019

(65) Prior Publication Data

US 2020/0262494 A1 Aug. 20, 2020

(30) Foreign Application Priority Data

Feb. 20, 2019 (KR) .................. 10-2019-0019819

(51) Int. Cl.
 *B62D 37/00* (2006.01)
 *B62D 35/02* (2006.01)
 *B60K 11/08* (2006.01)

(52) U.S. Cl.
 CPC .............. *B62D 35/02* (2013.01); *B60K 11/08* (2013.01)

(58) Field of Classification Search
 CPC ................................ B62D 35/02; B60K 11/08
 See application file for complete search history.

(56) References Cited

U.S. PATENT DOCUMENTS

2019/0233026 A1* 8/2019 Nakamura ............. B62D 25/24

FOREIGN PATENT DOCUMENTS

JP 2006044337 A * 2/2006
KR 10-2018-0069266 A 6/2018

* cited by examiner

*Primary Examiner* — Lori L Lyjak
(74) *Attorney, Agent, or Firm* — Morgan, Lewis & Bockius LLP

(57) ABSTRACT

An undercover structure for guiding air flow includes a body part having a planar-plate shape and mounted on a lower surface of a vehicle. A through hole is formed in the body part to allow air flowing above the body part to be directed to a region under the body part.

15 Claims, 4 Drawing Sheets

UNDERCOVER STRUCTURE FOR VEHICLE FOR GUIDING AIR FLOW

CROSS-REFERENCE(S) TO RELATED APPLICATIONS

This application claims priority to Korean Patent Application No. 10-2019-0019819, filed on Feb. 20, 2019 in the Korean Intellectual Property Office, which is incorporated herein by reference in its entirety.

TECHNICAL FIELD

The present disclosure relates to an undercover structure configured to guide air flow, and more particularly, to an undercover structure for a vehicle configured to increase air volume, which increases a flow rate of air flowing into a radiator through a front grille.

BACKGROUND

A light generating device such as a headlight that is turned-on when a vehicle is traveling at night, a turn indicator that is turned on/off when entering a corner area, and the like, and a heat exchanging device such as a radiator that radiates heat of coolant into air are mounted on a front portion of the vehicle.

Generally, a front grille is positioned at a center of the front portion of the vehicle, the light generating devices are symmetrically positioned at left and right sides of the front grille, and the heat exchanging device is positioned behind the front grille.

When the vehicle is traveling, an air resistance caused by atmospheric air acts in a direction opposite to a traveling direction of the vehicle. Since a driving force generated in a power generating device is lost by the air resistance, in order to maximize energy efficiency of the power generating device, an external appearance of the vehicle needs to be designed to minimize the air resistance.

For this reason, angular shapes for the front portion, a bonnet, a windshield, an A-pillar, a loop and trunk of the vehicle have been used, and these elements have been designed to have a curved shape. Since the respective portions constituting to a top surface of the vehicle are manufactured to have a curved shape, when the vehicle is traveling, air existing in the traveling direction flows along the surface of the vehicle and the air resistance can be thus decreased.

In addition to the top surface of the vehicle, the air resistance may be increased depending on a shape of a lower surface of the vehicle. A supporter configured to support an engine, a suspension, a universal joint, a transmission, and various kinds of brackets exist on the lower surface of the vehicle, and therefore, these elements are highly likely to generate a vortex in air flowing on the lower surface of the vehicle when the vehicle is traveling. Moreover, each of the parts constituting to the lower surface of the vehicle may block a continuous flow of air and may directly encounter flowing air to greatly increase the air resistance. In view of the above, an undercover structure has been mounted so as not to allow the lower surface of the vehicle other than a tire, which is in contact with the ground, to be exposed to air.

As described above, air flows into the heat exchanging device through the front grille mounted on the front portion of the vehicle. In addition, the top surface of the vehicle is formed to have a continuous curvature by which the air resistance may be reduced, and the undercover structure may be mounted on the lower surface of the vehicle to reduce the air resistance.

Therefore, air flowing into the heat exchanging device through the front grille cannot be easily discharged from the heat exchanging device to the outside of the vehicle unless a separate discharge port is formed on an engine room. For this reason, in order to increase heat exchange efficiency of the heat exchanging device, a size of the heat exchanging device has to be increased.

The contents described in Description of Related Art are to help the understanding of the background of the present disclosure, and may include what is not previously known to those skilled in the art to which the present disclosure pertains.

SUMMARY OF THE DISCLOSURE

It is an object of the present disclosure, which has been made in view of the above, to provide an undercover structure configured to enable air flowing into a heat exchanging device to be discharged under a vehicle therethrough, thereby increasing air volume of air flowing into the heat exchanging device.

An undercover structure for increasing air volume according to an exemplary embodiment of the present disclosure may include a body part having a planar-plate shape and mounted on a lower surface of a vehicle. A through hole may be formed in the body part to allow air flowing above the body part to be guided to a region under the body part.

A duct formed in the form of a box having an opened bottom may be formed on the body part to be protruded upward, and the through hole may be located in an upper surface of the duct.

The through hole may be formed in a slit shape in a widthwise direction of the duct, and by the through hole, the duct may be partitioned into a first body portion corresponding to a traveling direction of the vehicle and a second body portion corresponding to a direction opposite to the traveling direction of the vehicle.

The first body portion may be formed to be inclined such that a height thereof is decreased from the through hole in a traveling direction of the vehicle, and the second body portion may be formed to be inclined such that a height thereof is decreased from the through hole in a direction opposite to the traveling direction of the vehicle.

A height of an end portion of the first body portion adjacent to the through hole may be smaller than that of an end portion of the second body portion adjacent to the through hole.

A guide may be mounted under the duct to face the through hole.

The duct may have a width greater than that of the guide.

The guide may include an entrance portion configured to guide air, which flows under the body part, to the duct while the vehicle is traveling and an extension portion extended from the entrance portion so as to be parallel with the body part.

The entrance portion may be formed to be extended and inclined downward from a boundary point between the extension portion and the entrance portion towards the ground on which the vehicle is traveling.

The boundary point between the entrance portion and the extension portion may be located under a boundary point between the first body portion and the through hole.

The body part may be provided with one or more through holes formed therein and one or more ducts formed thereon, and a height of each of side ducts near left and right sides of the body part may be smaller than that of a central duct located at a center of the body part.

A width of the through hole provided in the side duct may be smaller than that of the through hole provided in the central duct.

An undercover structure for increasing air volume, according to another exemplary embodiment of the present disclosure may include: a body part having a planar-plate shape and mounted on a lower surface of a vehicle; and a guide configured to guide air, which flows under the body part, to the body part when the vehicle is traveling.

The body part may have a through hole formed therein to allow a region above the body part to be in communication with a region under the body part, and air existing in a region above the body part may be guided to the region under the body part through the through hole by air which is guided to the region under the body part by the guide.

A duct formed in the form of a box having an opened bottom may be formed on the body part to be protruded upward, and the through hole may be positioned in an upper surface of the duct.

The through hole may be formed in a slit shape in a widthwise direction of the duct, and by the through hole, the duct may be partitioned into a first body portion corresponding to a traveling direction of the vehicle and a second body portion corresponding to a direction opposite to the traveling direction of the vehicle.

In order to achieve the above object, an undercover structure for increasing air volume according to one embodiment of the present disclosure may be mounted on a lower surface of a vehicle to reduce an air resistance, and may allow air flowing into an engine room through a front grille to flow to the ground on which a vehicle is traveling, thereby improving cooling performance of a radiator placed behind the front grille.

The undercover structure may be provided with a box-shaped duct which has a streamlined upper surface to be protruded towards the engine room, a guide configured to guide air flowing under the lower surface of the vehicle to the duct may be mounted on the lower surface of the vehicle to allow air to flow along an inner surface of the duct, and a through hole through which the engine room is in communication with a region under the vehicle may be formed in the duct.

As a flow rate of the air flowing along the duct is increased, static pressure in the through hole and the duct may be decreased.

The through hole may be formed in a widthwise direction of the duct.

A width of the guide may be equal to that of the duct, and a length of the guide may be smaller than that of the duct.

An undercover structure for increasing air volume according to another exemplary embodiment of the present disclosure may include a planar-plate shaped body part configured to be mounted on a lower surface of a vehicle, and a flow guiding part formed on the body part to enable air existing in a region above the body part to flow to a region under the body part. By this configuration, air existing in a region above the body part flows to a region under the body part due to a change in static pressure generated in the flow guiding part when the vehicle is traveling.

The flow guiding part may include a discharge hole formed in the body part, a duct which is provided with a through hole formed therein for opening the discharge hole towards a region above the body part and is mounted on the body part to cover the discharge hole, and a guide mounted to the discharge hole to allow air flowing under the body part to flow into the duct.

The duct may be formed to have a streamlined upper surface so that air flowing through the guide flows along an inner surface of the duct, and the through hole may be formed in a widthwise direction of the duct so as to prevent air flowing into the duct through the guide from flowing to a region above the body part.

By the through hole, the duct may be partitioned into a first body portion corresponding to a traveling direction of the vehicle and a second body portion corresponding to a direction opposite to the traveling direction of the vehicle, and a height of an end portion of the first body portion adjacent to the through hole may be smaller than that of an end portion of the second body portion adjacent to the through hole.

A bending portion may be formed on the first body portion, and the first body portion may be formed such that a section from the bending portion to an end portion thereof is inclined upward.

The guide may include an entrance portion configured to guide air, which flows under the body part, to the duct while the vehicle is traveling, and an extension portion extended from the entrance portion so as to be parallel with the body part.

The entrance portion may be positioned under the first body portion, and the extension portion may be positioned under the discharge hole and the second body portion.

The entrance portion may be extended and inclined downward from a boundary point between the entrance portion and the extension portion towards the ground on which the vehicle is traveling.

A length of the extension portion may be smaller than that of the second body portion of the duct.

According to the undercover structure configured to increase air volume according to the exemplary embodiments of the present disclosure constructed as above, since air existing in the heat exchanging device positioned above the undercover structure flows to a region under the undercover structure through the through hole, air supplied to the heat exchanging device through the front grille is easily discharged.

In particular, since the flow rate of air supplied to and discharged from the heat exchanging device is increased, heat exchange efficiency of the heat exchanging device is increased. Accordingly, even if a size of the heat exchanging device is reduced, it is possible to achieve the same heat exchange performance. Since the size of the heat exchanging device is reduced, the manufacturing cost for the heat exchanging device may be saved, and this helps to reduce weight of the vehicle.

DESCRIPTION OF SPECIFIC EMBODIMENTS

Figure 1:
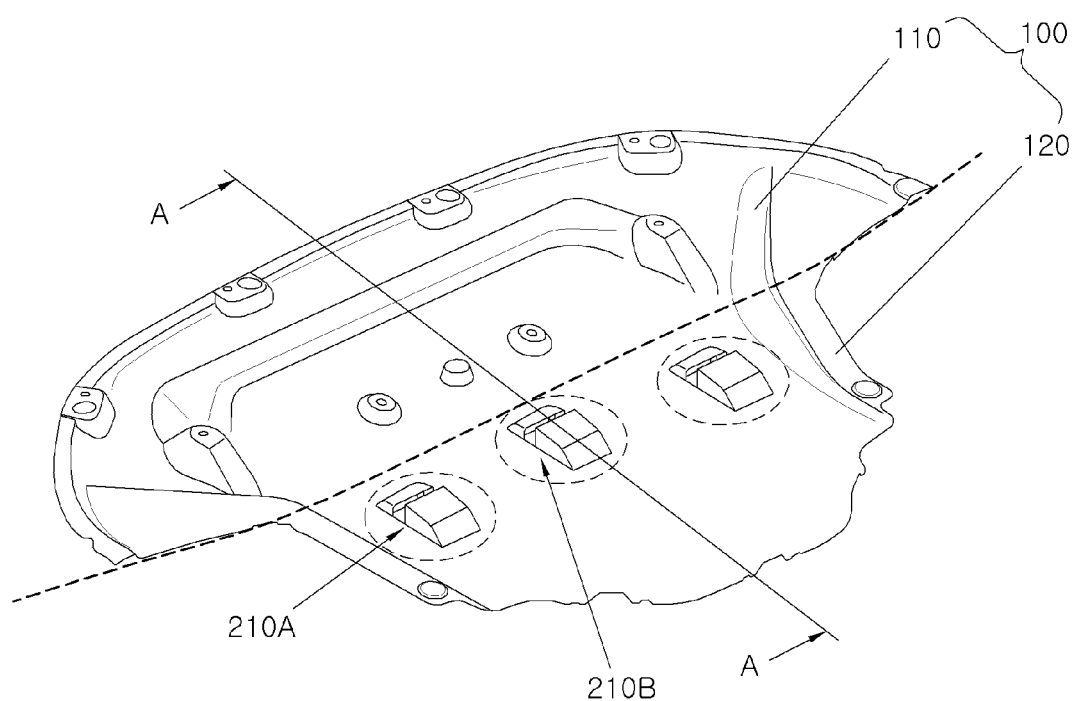
FIG. 1 is a perspective view of an undercover structure configured to increase air volume, in accordance with an exemplary embodiment of the present disclosure.

Hereinafter, exemplary embodiments of the present disclosure will be described in detail with reference to the accompanying drawings. However, in the following description and the accompanying drawings, a detailed description of well-known functions or configurations that can obscure the subject of the present disclosure will be omitted. In addition, it should be noted that the same components are denoted by the same reference numerals as much as possible throughout the entire drawings.

Hereinafter, an undercover structure configured to increase air volume, in accordance with an exemplary embodiment of the present disclosure is described with reference to the accompanying drawings.

Figure 2:
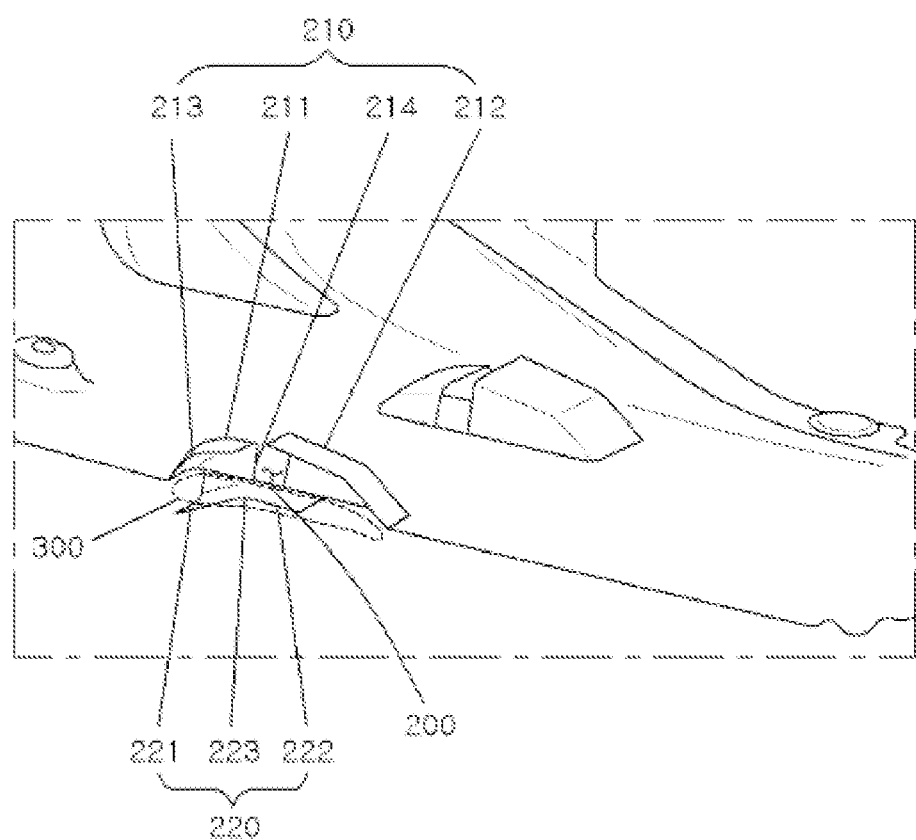
FIG. 2 is a cross-sectional view of the undercover structure configured to increase air volume, taken along line A-A in FIG. 1.
Figure 3:
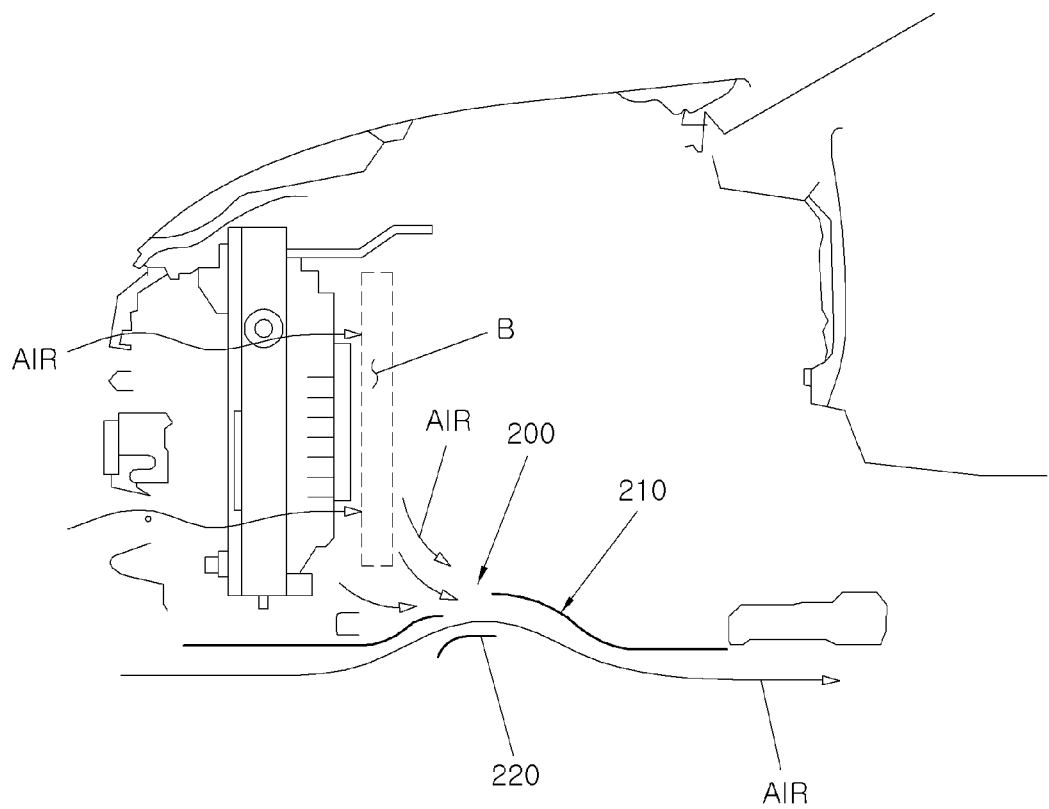
FIG. 3 is an exemplary view showing air flow under a vehicle on which the undercover structure configured to increase air volume, shown in FIG. 1 is mounted.

As illustrated in FIGS. 1 to 3, an undercover structure configured to increase air volume, in accordance with an exemplary embodiment of the present disclosure includes a planar-plate shaped body part 100 configured to be mounted on a lower surface of a vehicle and a through hole 200 formed in the body part 100 to enable air existing in a region above the body part 100 to flow to a region under the body part 100. In this configuration, air existing in a region above the body part 100 flows to a region under the body part 100 by a change in static pressure generated in the through hole 200 when the vehicle is traveling.

The body part 100 includes a front lower end portion 110 located at a lower end of a front portion of the vehicle and formed to have both rounded-shaped ends in a widthwise direction and a tire side portion 120 extended from the front lower end portion 110 to be positioned at one side of a tire mounted on a steering wheel. The front lower end portion 110 and the tire side portion 120 are formed to have a curvature toward the ground. The body part 100 is provided with a plurality of fixing portions configured to allow the body part to be connected to a vehicle body. The fixing portion may be a through hole through which a fastening bolt passes.

The plurality of through holes 200 are formed in the tire side portion 120 of the body part 100. A duct 210 formed in the form of a box having an opened bottom is formed on the body part 100 to be protruded upward. The through hole 200 is positioned in an upper surface of the duct 210. The through hole 200 is formed in a slit shape in a widthwise direction of the duct. By the through hole 200, the duct 210 may be partitioned into a first body portion 211 corresponding to a traveling direction of the vehicle and a second body portion 212 corresponding to a direction opposite to the traveling direction of the vehicle.

According to Bernoulli's principle, static pressure is decreased at a point where a flow rate of fluid is high, and static pressure is maximized at a point where fluid does not flow. Since air flowing under the vehicle flows to the duct 210, the static pressure in the duct 210 is lowered according to Bernoulli's principle, and the static pressure in the through hole 200 formed in the duct 210 is also lowered. Due to a decrease in the static pressure generated in the through hole 200, air stagnated at a rear end B of a heat exchanging device positioned above the tire side 120 is guided into the through hole 200. Air stagnated at the rear end B of the heat exchanging device and flowing to the through hole 200 flows into the duct 210 through the through hole 200 and is discharged to a region under the vehicle through the second body portion 212.

According to one example, a discharge hole 300 may be formed in the body part 100, and the duct 210 provided with the through hole 200 formed in the upper surface thereof may be mounted on the body part 100 to cover the discharge hole 300. According to shapes of the discharge hole 300 and the through hole 200, the amount of the air flowing into and discharged from the duct 210 may be changed and a vibration noise generated in the duct 210 may be controlled.

Referring again to FIG. 2, a guide 220 is mounted under the through hole 200 so as to face the duct 210. The duct 210 is formed to have the streamlined upper surface so that air flowing into the duct 210 through the guide 220 flows along an inner surface of the duct 210 to increase a flow rate.

When air flowing into the duct 210 through the guide 220 flows along the streamlined inner surface of the duct 210, as if a lift force is generated on wings of an airplane, a moving distance of air is increased to increase a flow rate, and the static pressure in the duct 210 and the through hole 200, in which air flows, is decreased.

The through hole 200 is formed on the upper surface of the duct 210 in the widthwise direction to prevent air flowing into the duct 210 through the guide 220 from flowing to a region above the body part 100. With respect to the through hole 200, the upper surface of the duct 210 is partitioned into the first body portion 211 corresponding to the traveling direction of the vehicle and the second body portion 212 corresponding to the direction opposite to the traveling direction of the vehicle. The first body portion 211 is formed to have a height which is smaller than that of the second body portion 212 with respect to the through hole 200. Even though air flowing under the body part 100 flows into the duct 210 and flows from the first body portion 211 to the second body portion 212, since a height of the second body portion 212 is high, a space into which air flowing above the body part 100 flows is secured in the second body portion 212. Even though air flowing above the body part 100 flows into the second body portion 212, since the second body portion 212 has a height greater than that of the first body portion 211 and consequently has a larger cross-sectional area, a change in flow rate of air flowing in the duct 210 is prevented even when a flow rate of air flowing between the second body portion 212 and the guide 220 is increased as compared with a flow rate of air flowing between the first body portion 211 and the guide 220.

A bending portion 213 is formed on the first body portion 211 so that an end portion of the first body portion 211 adjoining the through hole 200 is inclined upward. Since the end portion of the first body portion 211 is inclined upward, air flowing along the first body portion 211 is collected into the through hole 200. Accordingly, an increase of dynamic pressure of air generated in the first body portion 211 and the through hole 200 is significantly maintained, and a decrease in static pressure is maximized.

The guide 220 is mounted on a lower surface of the body part 100 so as to be positioned under the duct 210. The guide 220 is formed to have a width smaller than a width of the duct 210. The guide 220 has the same width as the duct 210 but has a length smaller than that of the duct 210.

The guide 220 includes an entrance portion 221 configured to guide air, which flows under the body part 100, to a region under the duct 210 when the vehicle is traveling, and an extension portion 222 extended from the entrance portion 221 so as to be parallel with the body part 100. The entrance portion 221 is formed to be extended and inclined downward from a first boundary point 223 between the extension portion 222 and the entrance portion 221 towards the ground on which the vehicle is traveling. The first boundary point 223 between the entrance portion 221 and the extension portion 222 is located under a second boundary point 214 between the first body portion 211 and the through hole 200.

The body part 100 may be provided with one or more through holes 200 formed therein and one or more ducts 210 formed thereon. A height of each of side ducts 210A near left and right sides of the body part 100 is smaller than that of a central duct 210B located at a center of the body part 100. A width of the through hole 200 formed in the side duct 210A is smaller than that of the through hole 200 formed in the central duct 210B.

Figure 4:
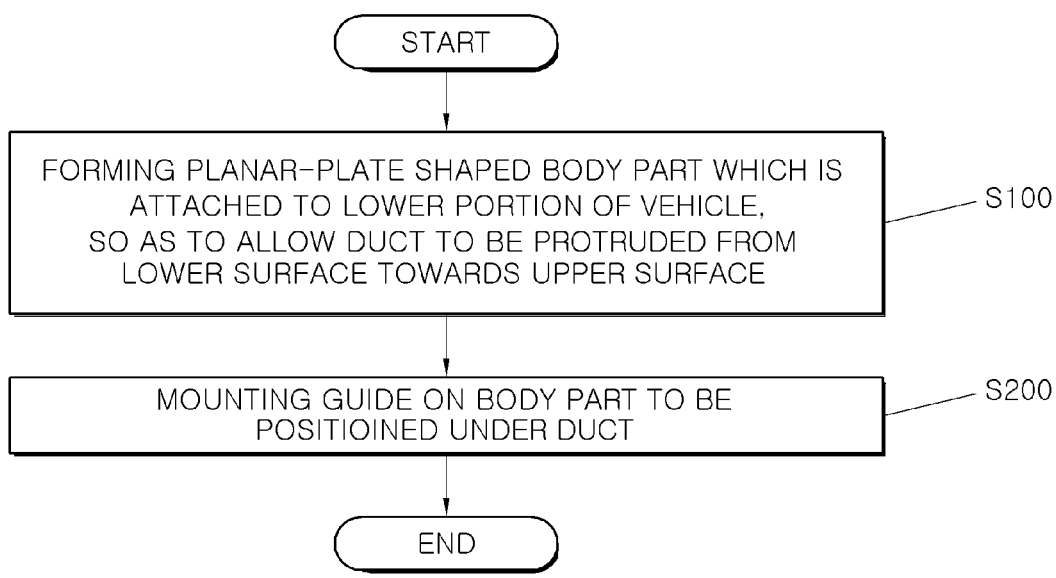
FIG. 4 is a flow chart describing a method for manufacturing the undercover structure configured to increase air volume, in accordance with an exemplary embodiment of the present disclosure.

The undercover structure configured to increase air volume according to one embodiment of the present disclosure constructed as above is manufactured according to the method illustrated in FIG. 4. As illustrated in FIG. 4, the undercover structure mounted on the lower surface of the vehicle to decrease air resistance and configured to increase air volume, according to one embodiment of the present disclosure includes step S100 of forming the planar-plate shaped body part 100 which is attached to the lower portion of the vehicle, so as to allow the duct 210 to be protruded from a lower surface towards an upper surface, and step S200 of mounting the guide 220 on the body part 100 so as to be positioned under the duct 210.

In step S100 in which the body part 100 is formed, the body part 100 is made of high-strength plastic. An external shape of the body part 100 is formed through an injection molding process. After the injection molding process, a plurality of carbon fiber layers may be additionally deposited on the surface of the body part 100. Then, the duct 210 provided on the body part 100 is cut to form the through hole 200. After forming the through hole 200, a polishing process may be performed on the surface of the body part 100. Furthermore, the guide 220 may be formed at the same time as the body part 100 is formed. The guide 220 is made of high-strength plastic. An external shape of the guide 220 is formed through an injection molding process. A plurality of carbon fiber layers may be additionally deposited on a surface of the guide 220. Then, the surface of the guide 220 may be polished.

In step S200 in which the guide 220 is mounted on the body part 100, the guide 220 is adhered to the body part 100. The guide 220 may be coupled to the body part 100 through a fastening bolt.

According to the undercover structure configured to increase air volume and the method for manufacturing the undercover structure configured to increase air volume according to the one embodiment of the present disclosure constructed as above, since air existing in the heat exchanging device positioned above the undercover structure flows to a region under the undercover structure through the through hole, air supplied to the heat exchanging device through the front grille is easily discharged.

In particular, since the flow rate of air supplied to and discharged from the heat exchanging device is increased, heat exchange efficiency of the heat exchanging device is increased. Accordingly, even if a size of the heat exchanging device is reduced, it is possible to achieve the same heat exchange performance. Since the size of the heat exchanging device is reduced, the manufacturing cost for the heat exchanging device may be saved, and this helps to reduce weight of the vehicle.

Although the present disclosure has been described with a focus on novel features of the present disclosure applied to various embodiments, it will be apparent to those skilled in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. An undercover structure for guiding air flow, the structure comprising:
a body part which has a planar-plate shape and is mounted on a lower surface of a vehicle; and
a duct having an opened bottom and disposed on the body part,
wherein the duct protrudes upward,
wherein a through hole is formed in the body part to allow air flowing above the body part to be directed to a region under the body part, and
wherein the through hole is located in an upper surface of the duct.

2. The undercover structure of claim 1, wherein the duct has a box shape.

3. The undercover structure of claim 1, wherein the through hole is formed in a slit shape in a widthwise direction of the duct, and
wherein the duct is partitioned into a first body portion corresponding to a traveling direction of the vehicle and a second body portion corresponding to a direction opposite to the traveling direction of the vehicle.

4. The undercover structure of claim 3, wherein the first body portion has an inclined portion such that a height of the first body portion is decreased from the through hole in a traveling direction of the vehicle, and
the second body portion has an inclined portion such that a height of the second body portion is decreased from the through hole in a direction opposite to the traveling direction of the vehicle.

5. The undercover structure of claim 4, wherein a height of an end portion of the first body portion adjacent to the through hole is smaller than that of an end portion of the second body portion adjacent to the through hole.

6. The undercover structure of claim 3, wherein a guide is mounted under the duct to face the through hole.

7. The undercover structure of claim 6, wherein the duct has a width greater than that of the guide.

8. The undercover structure of claim 6, wherein the guide comprises:
an entrance portion configured to guide air, which flows under the body part, to the duct while the vehicle is traveling; and
an extension portion extending from the entrance portion in parallel with the body part.

9. The undercover structure of claim 8, wherein the entrance portion extends and then is inclined downward from a boundary point between the extension portion and the entrance portion towards a ground on which the vehicle is traveling.

10. The undercover structure of claim 8, wherein the boundary point between the entrance portion and the extension portion is located under a boundary point between the first body portion and the through hole.

11. The undercover structure of claim 3, wherein the body part includes one or more through holes formed therein and one or more ducts formed thereon, and wherein a height of each of side ducts disposed adjacent left and right sides of the body part is smaller than that of a central duct located at a center of the body part.

12. The undercover structure of claim 11, wherein a width of the through hole formed in the side duct is smaller than that of the through hole formed in the central duct.

13. An undercover structure for guiding air flow, comprising;
   a body part having a planar-plate shape and mounted on a lower surface of a vehicle; and
   a guide configured to guide air, which flows under the body part, to the body part when the vehicle is traveling,
   wherein the body part has a through hole formed therein to allow a region above the body part to be in communication with a region under the body part,
   wherein air flowing in the region above the body part is guided to the region under the body part through the through hole by air which is guided to the region under the body part by the guide, and
   wherein a duct having an opened bottom is formed on the body part to be protruded upward, and the through hole is located in an upper surface of the duct.

14. The undercover structure of claim 13, wherein the duct is formed in the form of a box.

15. The undercover structure of claim 13, wherein the through hole is formed in a slit shape in a widthwise direction of the duct, and
   wherein the duct is partitioned into a first body portion corresponding to a traveling direction of the vehicle and a second body portion corresponding to a direction opposite to the traveling direction of the vehicle.

* * * * *